United States Patent [19]

Ivey

[11] 4,081,978

[45] Apr. 4, 1978

[54] MOBILE RADIO SECURITY DEVICE

[76] Inventor: Hollis L. Ivey, 1305 E. 14th St., Lumberton, N.C. 28358

[21] Appl. No.: 738,009

[22] Filed: Nov. 2, 1976

[51] Int. Cl.² .............................................. E05B 73/00
[52] U.S. Cl. ...................................................... 70/58
[58] Field of Search ................... 70/58, 258; 248/203, 248/27, 225; 211/4; 312/246; 224/42.45 R; 160/223, 372

[56] References Cited

U.S. PATENT DOCUMENTS

| 900,507 | 10/1908 | Francis | 160/372 |
|---|---|---|---|
| 3,690,131 | 9/1972 | Davis | 70/238 |
| 3,918,599 | 11/1975 | Porter | 248/203 |
| 3,945,227 | 3/1976 | Reiland | 70/58 |

*Primary Examiner*—Robert L. Wolfe
*Attorney, Agent, or Firm*—Clarence A. O'Brien; Harvey B. Jacobson

[57] ABSTRACT

A mobile radio and electronic equipment security device for preventing the unauthorized removal of said mobile equipment from a vehicle in which it is mounted and installed which includes stainless steel self-threading eyebolts with lock nuts thereon for replacing the conventional mounting screws of the mobile equipment mounting structure and a two-part telescoping U-shaped rod member with each end of the open U-portion terminating in closed eyes. The eye of one of the threaded eyebolts is interengaged with the eye of one of the U-shaped ends while the eye of the other eyebolt is engaged with the remaining end of the telescoping U-shaped rod member by locking structure. In one embodiment of the device an enlarged sleeve portion provided on one part of the U member permits the other part of the U member to telescopically slide therewithin. This permits adjustment for a wide range of sizes of mobile radio and electronic equipment devices. An internal shortening rod is included with this embodiment for increasing the strength with flexibility of size. A specially designed lock structure is also provided for connecting one end of the U-shaped security rod with one of the self-threading mounting eyebolts. This locking structure consists of two interthreaded cylindrical members having enlarged flange portions externally thereof and a central key operated lock internally of the inner lock member. In another embodiment interengaging eyes on each of the rod members provides for the variation in width of the device. Another type lock structure may also be used.

8 Claims, 7 Drawing Figures

U.S. Patent  April 4, 1978  Sheet 1 of 2  4,081,978
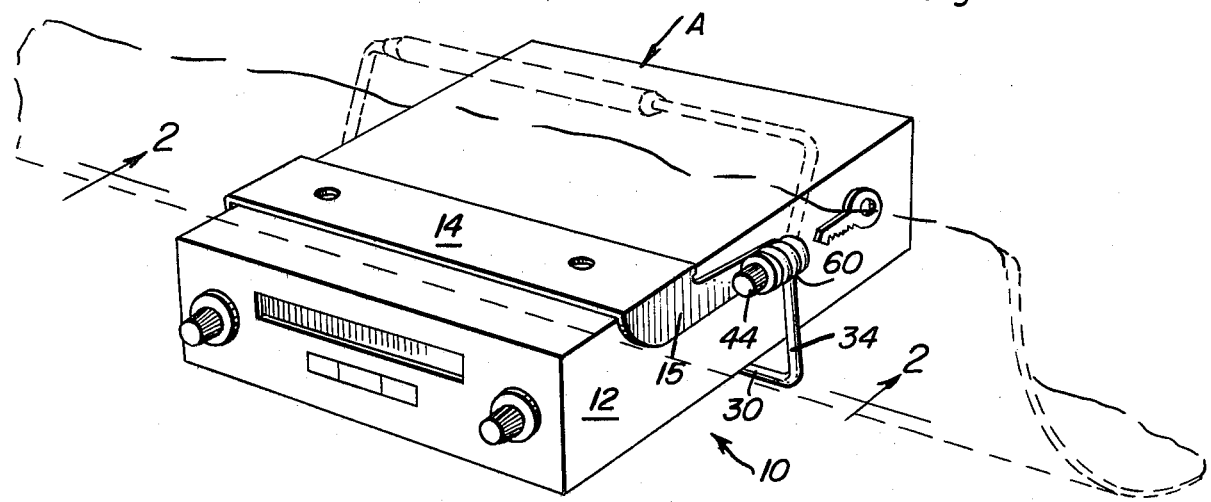
Fig. 1
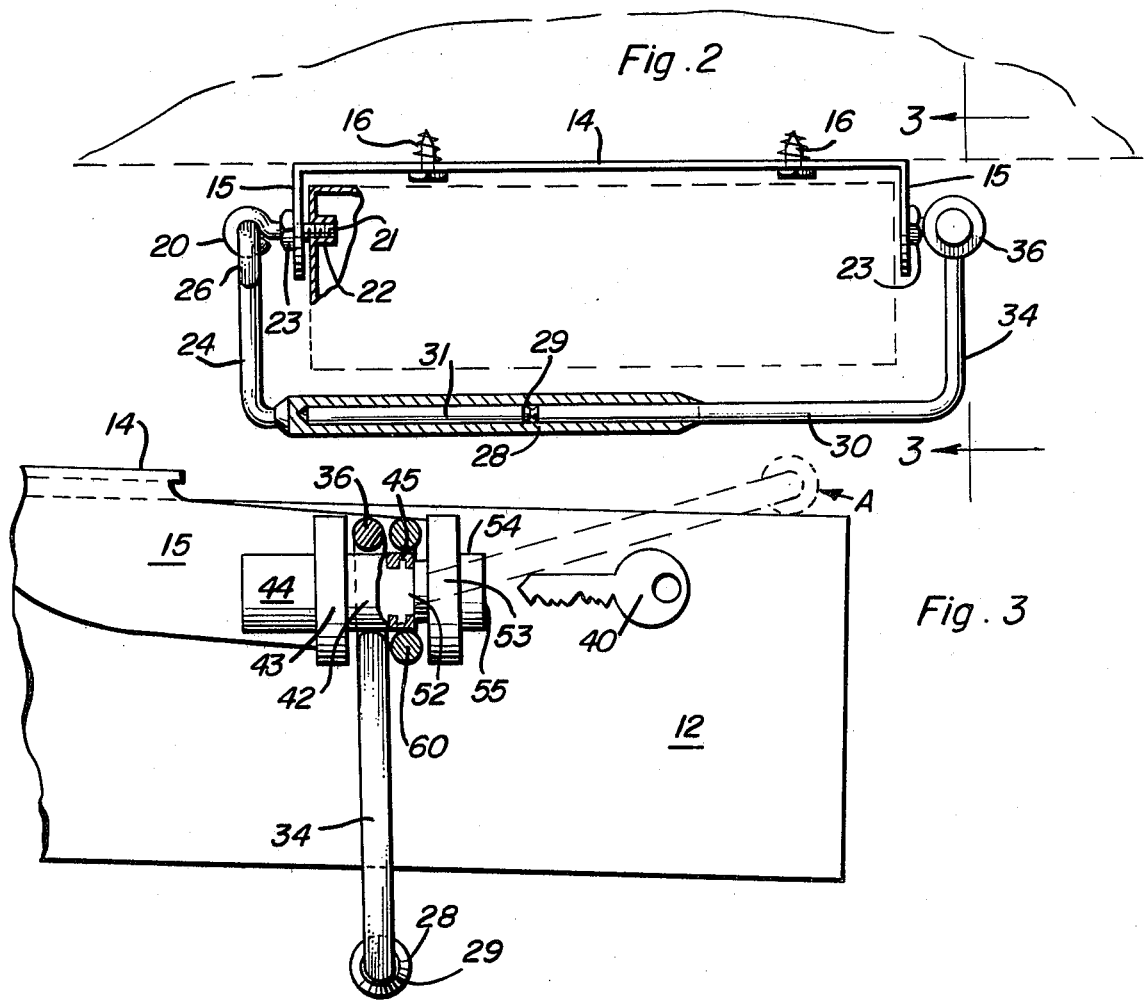
Fig. 2
Fig. 3

MOBILE RADIO SECURITY DEVICE

BACKGROUND OF THE INVENTION

1. Field of the Invention

This invention relates generally to devices for preventing the unauthorized removal of mobile radios and the like as mounted and installed in vehicles.

2. Description of the Prior Art

A common problem with known type devices for preventing unauthorized removal of electronic equipment as mounted in vehicles is that they commonly are not adjustable in size or accommodation of various arrangements of electronic equipment. That is, the device must be specifically designed for a particular type of mobile electronic equipment.

Another problem with known type devices is that they involve a number of parts, many of which are fairly complicated, which increases the overall cost of making, distributing and selling of said devices.

Another known problem with conventional security devices is that many of them employ conventional-type locks which are easily opened by people with simple lock-picking equipment which quickly defeats the purpose of the overall device.

Known prior art patents which may be pertinent to this invention are as follows: U.S. Pat. Nos. 2,693,691, R. W. Pasanen, Nov. 9, 1954; 3,370,446, T. H. Francis, Feb. 27, 1968; 3,410,122, E. L. Moses, Nov. 12, 1968; 3,673,828, A. R. Jones, July 4, 1972; 3,945,227, P. M. Reiland, Mar. 23, 1976.

None of these prior are devices offers the new and unique features of the invention disclosed herein.

SUMMARY OF THE INVENTION

An object of the present invention is to provide a mobile radio and electronic equipment security device for preventing the unauthorized removal of such radio and other electronic equipment from a vehicle in which same is installed.

Another object of the present invention is to provide a relatively simple, low maintenance device with the minimum number of parts; and an easy to install security device for electronic equipment to be mounted in vehicles for mobile use.

A further object of this inventionn is to provide a replacement eyebolt threaded structure for substituting for the conventional screws or bolts used to mount the electronic device to the conventional mounting bracket for same. Telescoping structure associated with the security device permits a wide range of sizes of electronic equipment to be appropriately secured. A unique tubular lock structure also is provided to secure the devices in closed position and to increase the overall security thereof.

The mobile radio security device of this invention has many advantages over known type devices. One great advantage is that a wide variation in sizes of electronic equipment to be secured to a vehicle can be safety acomodated. This is effected by the new and novel telescoping rod arrangement of the primary security structure. Also, the entire structure is made of stainless steel which may be heat hardened in order to reduce or eliminate the possibility of using bolt cutters and the like to sever the security device. Also, the use of stainless steel increases the attractive appearance of the structure.

Another important feature of this invention is that a minimum of structural components are required, keeping the overall cost down and greatly enhancing the use and saleability of same.

These, together with other objects and advantages which will become subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the mobile radio security device of this invention as installed.

FIG. 2 is an elevational view, partly in cross section, taken generally along line 2—2 of FIG. 1.

FIG. 3 is a side elevational view, partly in cross section, taken generally along line 3—3 of FIG. 2.

DESCRIPTION OF THE PREFERRED EMBODIMENT

Figure 4:
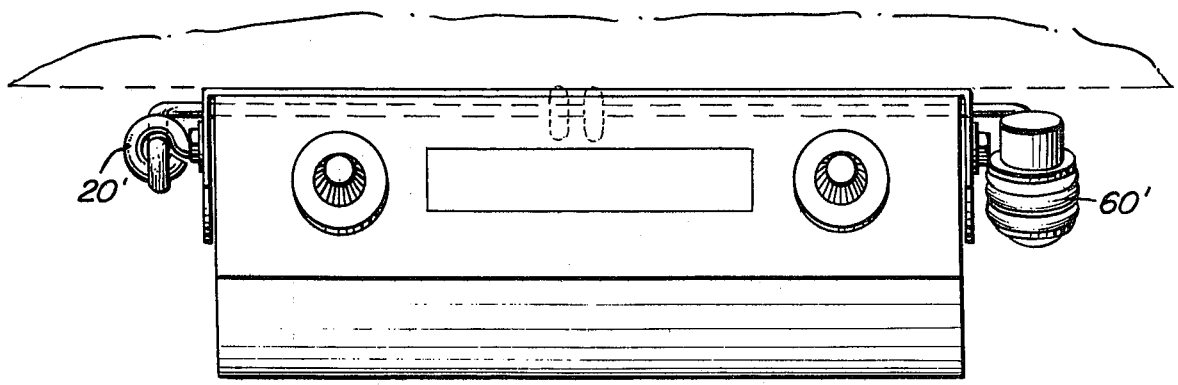
FIG. 4 is a front elevational view of a modified embodiment of the invention as installed.

Referring to FIG. 1 of the drawings, reference numeral 10 indicates in general the security device for attaching and preventing unauthorized removal of mobile radios and other electronic devices as installed in vehicles. As can be seen, the dash of a vehicle is shown in phantom lines with a mounting bracket 14 appropriately secured underneath of same by self-tapping screws 16. The bracket 14 has extending arms 15 for close association with the desired piece of electronic equipment to be installed in the vehicle. Normally, these brackets and mounting screws are provided with the electronic equipment as supplied by the manufacturer. Usually, screws or bolts will also be provided to fit through apertures at the ends of arms 15 for attachment of the mobile radio or other electronic equipment to the bracket mounted under the dash.

As part of this security device, the normally supplied screw or bolts are replaced with stainless steel self-threading eyebolt structures 20 and 60. These eyebolts each have a threaded portion 21 on the end opposite from the eye for reception in the threaded apertures 22 (only one shown) of the electronic equipment. Lock nuts 23 normally are also provided with the threaded eyebolt members in order to lock them in a desired angular position relative to the equipment and brackets 15.

Looking at FIG. 2, the left-side of the primary security rod member may be seen. This primary member is formed in two parts with the one portion an upstanding leg of a U configuration ending in an eye 26 which is formed and permanently secured to the eyebolt 20. The other end of this rod 24 is terminated in an enlarged portion 28 having an elongated central aperture therein 29. This portion 28 of the primary security rod structure receives telescopically therewithin a portion 30 of the other side of the primary security rod 34. The portion 34 is provided with another eyebolt end 36. Thus, as can be easily visualized by looking at FIG. 2, the telescoping portion 28, 29, 30 permits a wide range of electronic equipment to be installed in a vehicle. The normal range generally desired would be from approximately 5 inches to a maximum of 8½ inches. However, ranges greater than this may be accomplished by slight variation in structural size of the components. Also, as can be seen in FIG. 2, a filler rod 31 may be provided within the aperture 29 of the member 28 when the electronic device being secured is fairly wide or close to the 8½ inch maximum. This rod will increase the overall strength of the device and add to the security of same. Legs 24, 34 with body portions 28, 29, 30 as assembled form a U-shaped structure.

Looking at FIGS. 1–3, the unique and novel lock structure will now be described in detail. The eyebolt portions 36 and 60 are appropriately secured together in locking fashion by means of a primary tubular lock member 42 having an enlarged flange portion 43 and a knurled finger receiving and gripping portion 44. Internally of this primary tubular member is a central aperture which is appropriately threaded 45 for reception of the secondary part of the lock. The secondary part of the lock consists of another tubular member 52 having an extending projecting flange portion 53 provided thereon and an end member 54 of cylindrical nature. The portion 52 of the secondary member is appropriately threaded to complement the internally threaded aperture 45 of the primary cylindrical member. A key receiving lock aperture 55 is provided internally of the member 52, 53, 54 for receiving a key 40 to lock and unlock said structure. As can best be seen in FIG. 3, this lock when closed and locked will securely hold the eyes 36 and 20' together and thus prevent the unauthorized removal of whatever electronic equipment is secured thereby.

In some installations for appearance purposes, etc., the user of this device may prefer to have the security rod structure out of sight. In such a case, the eyebolt structures 20 and 60 are appropriately turned so that the device may be installed over the top of the electronic equipment as shown in phantom lines in FIGS. 1 and 3 and as indicated by reference A.

Figure 5:
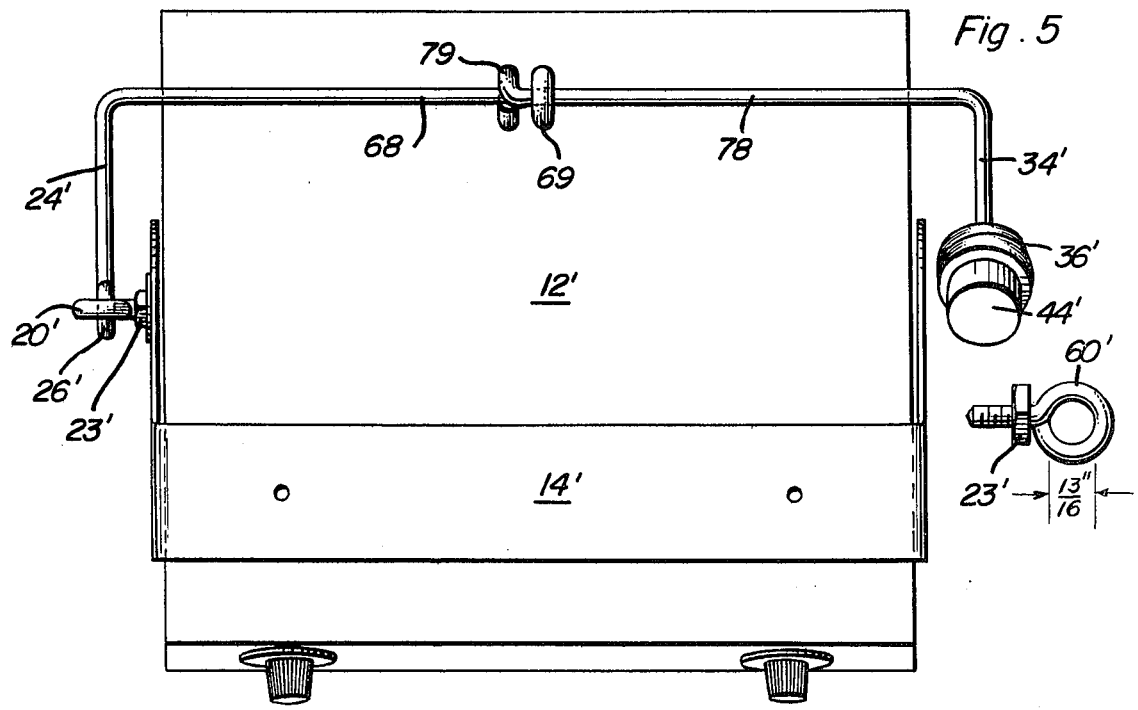
FIG. 5 is a top plan view of the second embodiment and the component parts thereof.
Figure 6:
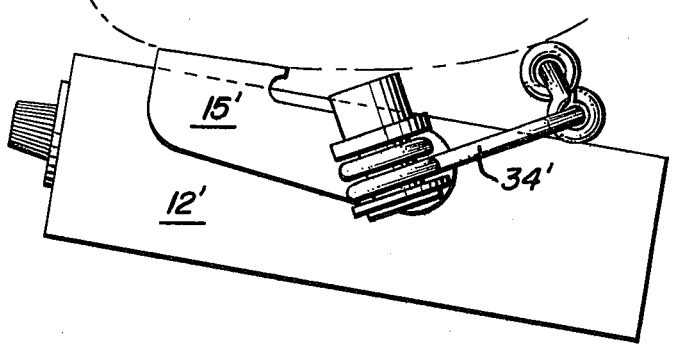
FIG. 6 is an end elevational view of the second embodiment.

FIGS. 4–7 show another embodiment of the structure of this invention. Like parts similar to those already described for FIGS. 1–3 are indicated by similar reference numerals with a prime thereafter. As can be seen by looking at FIG. 5, the eyebolt which receives the locking structure has a larger inner diameter than that of the eyebolt 20'. The eyebolt 60' desirably is provided with approximately a 13/16th-inch inner diameter. Similarly, the eye 36' on the end of the U-shaped member 34' has a similar inner diameter. The rod portions 68 and 78 as best seen in FIG. 5, terminate in additional eyes which extend perpendicular to the main rod portions 68 and 78. These additional eyes 69 and 79 on the respective ends of the rod members are interengaged to provide the telescoping feature equivalent to that of the tubular member 28 and by member 30 of the first embodiment. As can be easily visualized, this second embodiment eliminates some of the manufacturing requirements of the first embodiment, and thereof is somewhat easier and less expensive to manufacture. Instead of using stainless steel material for this embodiment, it has been found in actual practice that hardened steel rods having chrome or nickel plating thereon are entirely suitable and provide the necessary hardness and strength for a secure locking structure. The rods normally are ¼ inch in diameter. Similarly, ½-inch rods may be used to manufacture the eyebolts 20' and 60'. Also, this embodiment is shown as having the telescoping connecting portions mounted above the electronic equipment 12' which again in actual use has been found to be the preferred position.

Figure 7:
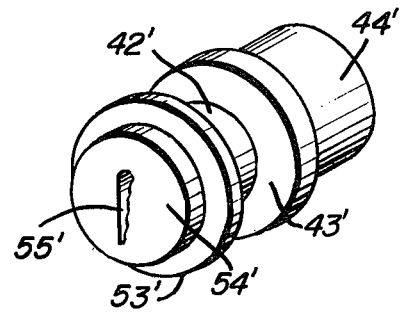
FIG. 7 is a perspective view of a modified utility locking device.

The locking structure shown in FIG. 7 basically is quite similar to that shown in FIG. 3 of the first embodiment, but is a modified commercially available lock unit. This lock unit has been constructed so that it will function in the same manner as in the first embodiment to hold the enlarged eye portions 36' and 60' securely together. Also conventional type padlocks may be used to secure the locking eyes of either embodiment together in case the specially configured lock is lost or otherwise unavailable.

As can be readily visualized from the above description, this device is relatively simple and easy to fabricate, has few parts with relatively no maintenance, and may be quickly and easily used when installing desired mobile electronic equipment in vehicles and the like.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A mobile radio and electronic equipment security device comprising; first means for replacing the conventional mounting bolts as used with the normal mounting bracket of mobile radio and electronic equipment devices, second means engageable with the first means for positively securing same, and locking means associated with the first and second means for preventing unauthorized opening of the overall device, the locking means including an entirely separate lock structure, the first means including at least one eyebolt member provided with equipment engaging means at the end thereof opposite to the eye structure, and the second means including a pivotally mounted primary security rod associated with the eye of the eyebolt and a secondary security rod lockable at the other end with the said locking means, the second means further including adjusting means for ready adjustment of the length of the security rod members to whatever size the mobile equipment device may be, the secondary rod member being provided at the end opposite to the adjusting means with an eye construction, and a second eyebolt member is provided with means for attachment to the mobile equipment device, and with the eye thereof in position for association with the eye construction on the end of the secondary rod member for appropriate locking by the said locking means.

2. A mobile radio and electronic equipment security device comprising; first means for replacing the conventional mounting bolts as used with the normal mounting bracket of mobile radio and electronic equipment devices, second means engageable with the first means for positively securing same, and locking means associated with the first and second means for preventing unauthorized opening of the overall device, the locking means including an entirely separate lock structure, the first means including at least one eyebolt member provided with equipment engaging means at the end thereof opposite to the eye structure, and the second means including a pivotally mounted primary security rod associated with the eye of the eyebolt and a secondary security rod lockable at the other end with the said locking means, the second means further including adjusting means for ready adjustment of the length of the security rod members to whatever size the mobile equipment device may be, the adjusting means including an enlarged tubular member integral with the primary security rod on the end opposite to the end attached to the eyebolt, and the second rod member telescoping within the enlarged portion, the secondary rod member being provided at the end opposite to the telescopic portion with an eye construction, and a second eyebolt member is provided with means for attachment to the mobile equipment device, and with the eye thereof in position for association with the eye construction on the end of the secondary rod member for appropriate locking by the said locking means.

3. The structure as set forth in claim 2, wherein the locking means for securing the two eye members together includes a two part cylindrical lock structure, and each of the cylindrical parts complement each other and are provided with enlarged flange portions for association with the outside portions of the eyes of the respective members.

4. The structure as set forth in claim 3, wherein one of the cylindrical members of the lock means has an elongated cylindrical portion with extending flange midway therealong, and one end being provided with a knurled finger gripping surface, and the other end being provided with a central aperture with screw threads therein.

5. The structure as set forth in claim 4, wherein the other complementary portion of the lock means includes a second cylindrical member having a projecting flange portion midway thereof, one end being provided with external threads thereon for complementary mating with the internal threads of the aforesaid first member when the secondary member is screwed into the first member, and also provided with lock means internally thereof operable by an appropriate key.

6. The structure as set forth in claim 2, wherein a third rod member is included of a length shorter than the enlarged tubular member integral with the primary security rod, and is inside of the tubular member for increasing the strength of the device.

7. The structure as set forth in claim 2, wherein the first and second eyebolt members are each provided with a lock nut for securing the respective eyebolt members in a desired fixed position with respect to the equipment device being secured.

8. The structure as set forth in claim 1, wherein the adjusting means includes an eye member integral with the primary security rod on the end opposite to the end attached to the eyebolt, and the secondary rod member also is provided with an eye member integral therewith, and said respective eye members are interengaged with the respective opposite rod members.

* * * * *